Patented Aug. 13, 1940

2,211,551

UNITED STATES PATENT OFFICE 2,211,551

WELDING GUN

Bruno E. Winkler, Detroit, Mich.

Application February 17, 1939, Serial No. 256,978

2 Claims. (Cl. 219—4)

My invention relates to welding guns chiefly of the fluid pressure type, and its principal object is to provide a gun in which the working or power stroke of the movable electrode is very much smaller than is possible with welding guns of the present type. In welding guns of the type mentioned, the fluid pressure pistons are provided with a stroke sufficient to permit opening of the gap between the electrodes to the extent necessary to pass over obstructions upon the work. When, for example, the parts to be welded are surrounded by flanges or other projections, it is necessary to separate the electrodes to a distance sufficient to pass over these obstructions, and this results in a very great waste of power as well as a considerable waste of time during each weld due to the extreme movement of the movable electrode in relation to the fixed electrode.

In one method of carrying my invention into effect, I provide the piston which carries the movable electrode with a stroke merely sufficient to permit the gun being pushed along the work, and in order to pass the gun over flanges and other obstructions I provide means for manually retracting the working cylinder together with its piston and co-acting electrode, and I provide also locking means for retaining the cylinder in its working position, so that when it is desired to pass the gun over an obstruction, it is merely necessary to disconnect the locking means and withdraw the cylinder while it is being passed over the obstruction, after which the cylinder is then moved inwardly to such position that the minimum possible stroke is necessary, and then lock the cylinder in its position.

This arrangement has the advantages firstly, that due to the short stroke of the piston during welding a minimum air consumption is required; secondly, due to the shorter stroke a great increase in the speed of welding is obtained; and thirdly, due to the fact that the movable electrode moves at each stroke through a very small distance away from the work, greater speed and accuracy in pushing the gun along the work is obtained. My improved gun has the further advantage that with a given working stroke it may be used for a greater variety of work, so that the total amount of equipment for a given industry is very much reduced. The shorter stroke also decreases the inertia forces, especially in repeat welding, and is consequently very much easier on the operator.

Another object of my said invention is to provide a gun in which the handle may be moved around the axis of the cylinder and locked in various positions so that it may be so located as to clear obstructions which occupy different positions in different classes of work. In order to meet this condition with ordinary guns the operator must be provided with two or more guns having handles in different positions in regard to the body of the gun itself.

A further object of my said invention is to provide a gun in which the movable electrode is connected to the transformer in such a manner as to dispense with the present reciprocating cable connection now used. The movement of this cable is productive of considerable annoyance to the operator and at the same time produces so much wear and tear that the cable has to be frequently renewed at considerable expense.

According to the present invention the connection between the body of the gun and the movable electrode is effected by means of a series of laminations made in the form of a U-shaped spring which has sufficient elasticity to provide ample movement, this method being, as will be understood, only possible because of the very much reduced stroke of the electrode.

In order that my invention may be readily understood I will now describe a preferred embodiment of the same with reference to the accompanying drawing, in which—

Like characters designate corresponding parts throughout the several views.

Figures 1, 2:
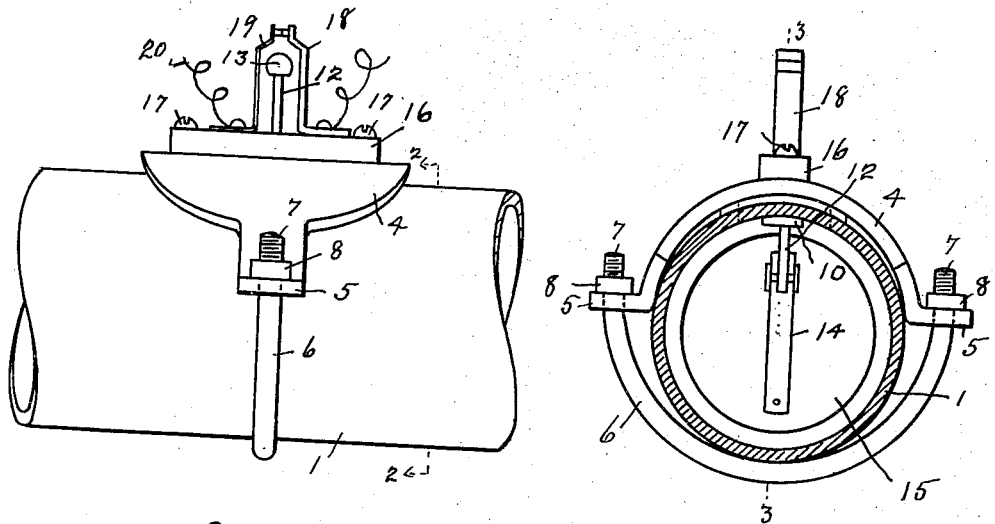
Figure 1 is a side elevation of the gun.
Figure 2 is a vertical section of the same.
Figures 3, 4:
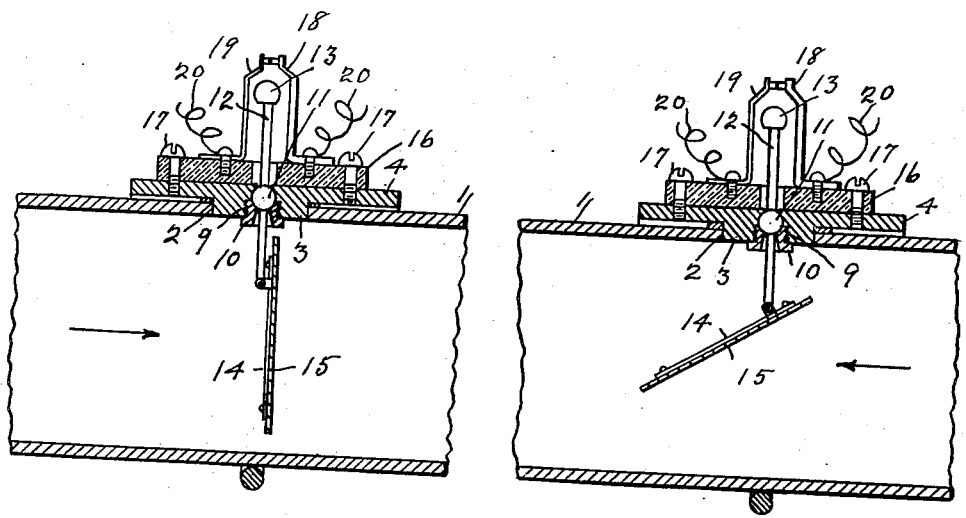
Figure 3 is a fragmentary view taken on line 3—3 of Figure 2.
Figure 4 is an end view of an interrupted screw and nut fastening to be hereinafter described.

In the drawing, 1 designates the body or frame of the gun, having at one end a circular aperture 11 in which is mounted one arm 21 of the L-shaped holder 2, the other arm 22 of which carries the fixed electrode 3. Co-axial with the electrode 3 and in opposed relation thereto is the moving electrode 4, carried in one end 51 of a rod 5 the other end 52 of which is secured to a piston 61 slidably mounted in the fluid pressure cylinder 6. The cylinder 6 is connected through valve means of any conventional type to a source of pressure supply so as to effect the desired reciprocatory movement of the electrode 4 and to exert the necessary force upon the workpiece.

As will be seen from the sectional view, Figure 2, the means of attachment of the cylinder 6 to the body 1 comprise a hollow concentric sleeve Aug. 13, 1940.  G. E. BOGUE  2,211,553

FLOW-OPERATED SWITCH

Filed April 12, 1939

Inventor
George E. Bogue
By Chapman & Ferguson
Attorney.